US006592292B1

United States Patent
Jansson

(10) Patent No.: US 6,592,292 B1
(45) Date of Patent: Jul. 15, 2003

(54) FLEXIBLE BOLT AND ASSEMBLY OF CONCRETE REVETMENTS EMPLOYING SAME

(76) Inventor: Jan Erik Jansson, 814 S. Sierra Ave., Solana Beach, CA (US) 92075-2616

( * ) Notice: Subject to any disclaimer, the term of this patent is extended or adjusted under 35 U.S.C. 154(b) by 0 days.

(21) Appl. No.: 10/294,958

(22) Filed: Nov. 14, 2002

(51) Int. Cl.[7] ................................ E02B 3/14
(52) U.S. Cl. .................. 405/20; 405/16; 405/19; 411/392; 411/908; 411/339; 411/510
(58) Field of Search .................. 405/20, 16, 17, 405/19; 411/392, 907, 908, 338, 339, 508, 509, 510

(56) References Cited

U.S. PATENT DOCUMENTS

| | | | |
|---|---|---|---|
| 1,164,707 A | | 12/1915 | Edinger |
| 1,352,429 A | * | 9/1920 | Clarke .................. 405/16 |
| 2,876,628 A | | 3/1959 | Dixon, Jr. |
| 3,367,694 A | * | 2/1968 | Witt .................. 403/389 |
| 3,466,966 A | * | 9/1969 | Brown .................. 411/510 |
| 3,903,702 A | | 9/1975 | Appleton |
| 4,074,888 A | * | 2/1978 | Garner .................. 248/475.1 |
| 4,338,755 A | * | 7/1982 | Chichester, Jr. .......... 411/80.2 |
| 4,490,083 A | * | 12/1984 | Rebish .................. 411/338 |
| 4,570,891 A | * | 2/1986 | Kaplan .................. 248/341 |
| 4,581,962 A | * | 4/1986 | Marbourg .................. 81/451 |
| 4,589,179 A | * | 5/1986 | Hulting, Jr. .................. 29/256 |
| 4,661,012 A | | 4/1987 | McCloskey |
| 4,664,552 A | * | 5/1987 | Schaaf .................. 405/20 |
| 4,854,797 A | * | 8/1989 | Gourd .................. 411/383 |
| 4,984,947 A | * | 1/1991 | Flauraud .................. 411/43 |
| 5,061,137 A | * | 10/1991 | Gourd .................. 411/510 |
| 5,108,222 A | | 4/1992 | Jansson et al. |
| 5,224,792 A | | 7/1993 | Hagenah |
| 5,484,230 A | | 1/1996 | Rudloff |
| 5,632,571 A | | 5/1997 | Mattox |
| 5,779,391 A | | 7/1998 | Knight |
| 5,906,456 A | | 5/1999 | Knight |
| 6,027,285 A | | 2/2000 | Angel et al. |
| 6,071,041 A | | 6/2000 | Knight |

FOREIGN PATENT DOCUMENTS

| | | | | |
|---|---|---|---|---|
| FR | 1265140 | | 5/1961 | |
| JP | 406146287 A | * | 5/1994 | .......... E02D/17/18 |

OTHER PUBLICATIONS

Bird Toys "Jumbo Plastic Bolt and Nut Sets", from www-.birdsjustwannahavefun.com/toys_2.htm; dated on or before Nov. 9, 2001 by www.archive.com. 4 pages.*
CarPak 2002 Catalogue, available fall 2001 or earlier.*
NESTA, "Profile" of Gino Dimola, Inventor of the flexible Quick Locating Bolt,from www.nesta.org.uk/ourawardees/profiles/1431/ and www.nesta.org.uk/ourawardees/profiles/1431/02_profile.html /02_profile.html and www.nesta.org.uk/generating_brilliance..,.*
{Continued from 2 above}, and www.pronovus.org.uk/old-news/news.htm, 12 pages total, dated Jul. 6, 2001 or earlier.*

* cited by examiner

Primary Examiner—J. J. Swann
Assistant Examiner—Katherine Mitchell
(74) Attorney, Agent, or Firm—Wood, Phillips, Katz, Clark & Mortimer

(57) ABSTRACT

In an assembly of concrete revetments, each having two expansive surfaces, each having a first set of comparatively larger holes extending between the expansive surfaces, and each having a second set of comparatively smaller holes extending from at least some holes of the first set to outer edges of said revetment, wherein the revetments of an adjacent pair of the assembly are connected to each other by one or more bolts, each bolt has a flexible, polymeric shank, which has a proximal end and a distal end, a head attached to the proximal end, and a nut attachable to the distal end, and each bolt has its shank extending through a hole of the second set of each revetment of the adjacent pair.

6 Claims, 1 Drawing Sheet

FLEXIBLE BOLT AND ASSEMBLY OF CONCRETE REVETMENTS EMPLOYING SAME

TECHNICAL FIELD OF THE INVENTION

This invention pertains to a bolt having a flexible shank and useful to connect two adjacent revetments in an assembly of concrete revetments.

BACKGROUND OF THE INVENTION

As exemplified in older patents including U.S. Pat. No. 2,876,628 and in newer patents including U.S. Pat. Nos. 5,108,222, 5,632,571, and 5,779,391, assemblies of predominantly concrete revetments are employed to line embankments, stream beds, and driveways for emergency vehicles.

As exemplified in U.S. Pat. No. 2,876,628 and in U.S. Pat. No. 5,779,391, cables are employed to connect the respective revetments of such an assembly to one another, whereby the assembly is articulated. As exemplified in U.S. Pat. No. 5,108,222 and in U.S. Pat. No. 5,632,571, a polymeric grid is employed to connect the respective revetments of such an assembly to one another, whereby the assembly is articulated.

As exemplified in older patents including U.S. Pat. No. 1,164,707 and French Patent No. 1,265,140 and in newer patents including U.S. Pat. Nos. 3,903,702, 4,661,012, 5,484,230, 5,779,391, 5,906,456, and 6,071,041, it is known for such a revetment to have marginal projections, which interfit with marginal recesses in adjacent, similar revetments. A revetment of related interest is disclosed in U.S. Pat. No. 5,224,792. As disclosed therein, the revetment has projecting spacers that abut or interlock with projecting spacers on an adjacent, similar revetment.

SUMMARY OF THE INVENTION

This invention provides a bolt having a flexible shank and useful to connect two adjacent revetments in an assembly of concrete revetments. The flexible shank, which is polymeric, has a proximal end and a distal end. The bolt has a heat, which is attached to the proximal end, and a nut, which is attachable to the distal end. Preferably, the shank and the head are molded unitarily from a polymeric material, such as 30% glass-filled, UV black-pigmented, nylon 6/6 copolymer. Preferably, moreover, the nut is molded from the same material. Preferably, the distal end is barbed and the nut is shaped complementarily, so as to fit over the distal end.

In an intended use in an assembly of concrete revetments, each having two expansive surfaces, each having a first set of comparatively larger holes extending between the expansive surfaces, and each having a second set of comparatively smaller holes extending from at least some holes of the first set to outer edges of said revetment, the revetments of an adjacent pair of the assembly are connected to each other by one or more bolts, as described in the preceding paragraph, each bolt having its shank extending through a hole of the second set of each revetment of the adjacent pair.

Although the bolt provided by this invention has the intended use described in the preceding paragraph, the bolt provided by this invention is expected to prove to be also useful in various similar and dissimilar applications.

DETAILED DESCRIPTION OF THE ILLUSTRATED EMBODIMENTS

Figure 1:
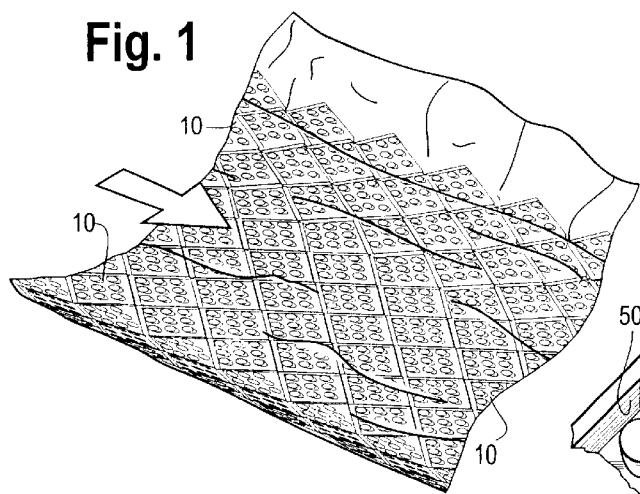
FIG. 1 is a pictorial view of an assembly of concrete revetments, as employed to line a stream bed, wherein the revetments of adjacent pairs are connected to each other by flexible bolts according to a preferred embodiment of this invention, as illustrated in FIGS. 2 and 3. None of the bolts are visible in FIG. 1.

As illustrated in FIG. 1, a stream bed is lined with an assembly of revetments 10, which assembly minimizes erosion of the stream bed and, under potential flooding conditions, helps to confine the stream bed between its normal banks. Except as illustrated and described herein, each revetment 10 is similar to the revetments disclosed in U.S. patent application Ser. No. 10/286,651, as filed by Jan Erik Jansson on Nov. 1, 2002, for "REVETMENT USEFUL TO LINE STREAM BED AND ASSEMBLY OF SAID REVETMENTS", the disclosure of which application is incorporated herein by reference.

Figure 2:
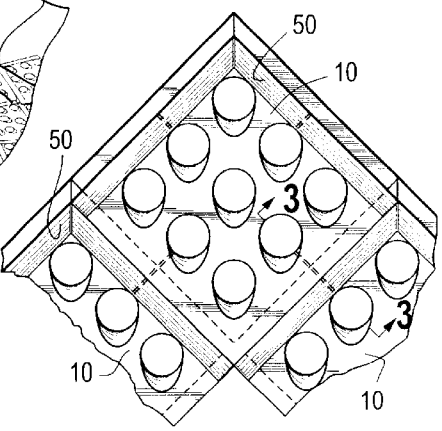
FIG. 2, in which some of the bolts are visible, is an enlarged, fragmentary detail, as taken from FIG. 1.
Figure 3:
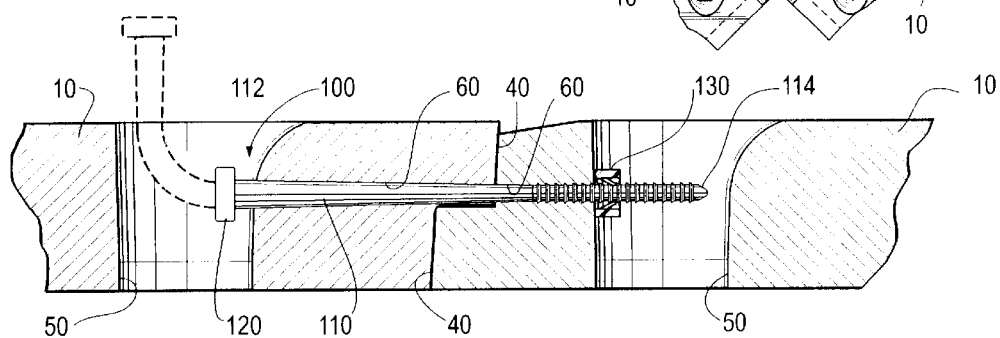
FIG. 3 is an enlarged cross-section, as taken along line 3—3 in FIG. 2, in a direction indicated by arrows.

As illustrated in FIGS. 1, 2, and 3, each revetment 10 is cast from concrete, except for reinforcing means, whereupon said revetment 10 is said to be predominantly made from concrete. Whether made wholly or predominantly from concrete, each revetment 10 has two expansive surfaces, namely, and upper surface 20 and a lower surface 30, and four outer edges 40. Moreover, each revetment 10 has a first set of comparatively larger holes 50 extending between the expansive surfaces 30, 40, and each revetment 10 has a second set of comparatively smaller holes 60 extending from at least some holes 50 of the first set to near outer edges 40 of said revetment 10.

As contemplated by this invention, the revetments 10 of an adjacent pair of the assembly are connected to each other by one or more bolts 100 according to this invention. Each bolt 100 has a flexible shank 110, which has a proximal end 112 and a distal end 114, a head 120 attached to the proximal end 112, and a nut 130 attachable to the distal end 114. The shank 110 and the head 120 are molded unitarily from a polymeric material, such as 30% glass-filled, UV black-pigmented, nylon 6/6 copolymer, and the nut 130 is molded from the same material.

When each bolt 100 is installed, the nut 130 of said bolt 100 is removed and the shank 110 of said bolt 100 is flexed, as illustrated in FIG. 3, so as to enable the flexed shank 110 to be inserted with its distal end 114 preceding, from a larger hole 50 of a given revetment 10, through a smaller hole 60 extending from the larger hole 50 and through a smaller hole 60 of an adjacent revetment 10, until the distal end 114 of the inserted shank 110 emerges from the smaller hole 60 into a larger hole 50 of the adjacent revetment, whereupon the nut 130 of said bolt 100 is attached to the distal end 114 of the shank 110 of said bolt 100. Thus, as the head 120 of said bolt 100 is larger than the first-mentioned hole 60, into which the flexed shank 110 is inserted and as the nut 130 is smaller than the second-mentioned hole 60, from which the distal end 114 emerges, said bolt 100 connects the given and adjacent revetments 10 to each other.

Figure 4:
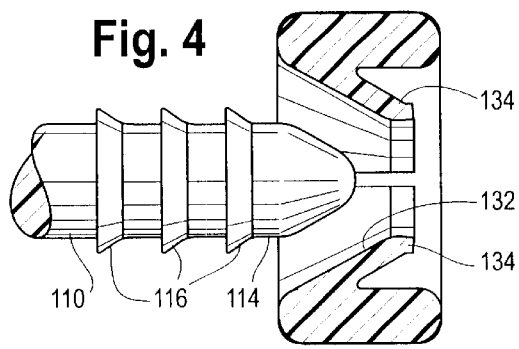
FIG. 4 is a further enlarged, exploded view of a flexible bolt including a nut and according to a preferred embodiment of this invention.
Figure 5:
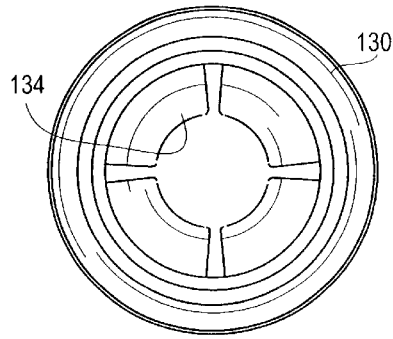
FIG. 5 is an axial view of the nut, as seen from the right in FIG. 4.
Figure 6:
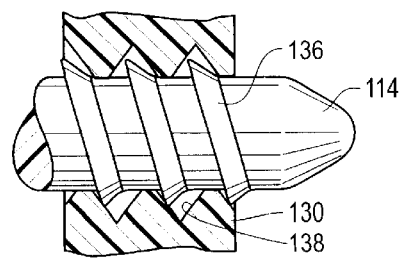
FIG. 6 is a similarly, enlarged, exploded view of a flexible bolt including a nut and according to an alternative embodiment of this invention.

In a preferred embodiment, as illustrated in FIGS. 4 and 5, the distal end 114 is barbed, so as to have a series of annular barbs 116, and the nut 130 is shaped complementarily, so to as to fit over the distal end 114. Moreover, the nut 130 has an inner, segmented flange 132, which is segmented into four segments 134 and which is flared so that the barbed end 114 can be easily inserted into the nut 130, until said segments 134 snap past one or more of the barbs 116, and which is adapted to engage one of the barbs 116 so that the barbed end 114 cannot be easily withdrawn from the nut.

In an alternative embodiment, as illustrated in FIG, 6, the distal end 114 has a male thread 136 and the nut 130 has a female thread 138, which enables the nut 130 to be threaded onto the distal end 114. Moreover, another nut (not shown) can be optionally threaded onto the distal end 114, so as to lock the nut 130 onto the distal end 114.

What is claimed is:

1. An assembly of concrete revetments, each having two expansive surfaces, each having a first set of comparatively larger holes extending between the expansive surfaces, and each having a second set of comparatively smaller holes extending from at least some holes of the first set to outer edges of said revetment, wherein the revetments of an adjacent pair of the assembly are connected to each other by one or more bolts, each bolt having a flexible, polymeric shank, which has a proximal end and a distal end, a head attached to the proximal end, and a nut attachable to the distal end, and each bolt having its shank extending through a hole of the second set of each revetment of the adjacent pair.

2. The assembly of claim 1 wherein the shank of each bolt and the head of said bolt are molded unitarily from a polymeric material.

3. The assembly of claim 1 wherein the shank of each bolt and the head of said bolt are molded unitarily from a polymeric material and wherein the nut of said bolt is molded from the same material.

4. The assembly of claim 1 wherein the distal end of each bolt is barbed and wherein the nut of said bolt is shaped complementarily, so as to fit over the distal end of said bolt.

5. The assembly of claim 1 wherein the distal end of each bolt is barbed and wherein the nut of said bolt is shaped complementarily, so as to fit over the distal end of said bolt.

6. The assembly of claim 1 wherein the distal end of each bolt is barbed and wherein the nut of said bolt is shaped complementarily, so as to fit over the distal end of said bolt.

* * * * *